(12) United States Patent
Nicholas et al.

(10) Patent No.: US 8,609,911 B1
(45) Date of Patent: Dec. 17, 2013

(54) CATALYTIC PYROLYSIS USING UZM-44 ALUMINOSILICATE ZEOLITE

(71) Applicant: UOP LLC, Des Plaines, IL (US)

(72) Inventors: Christopher P. Nicholas, Evanston, IL (US); Edwin P. Boldingh, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 13/792,879

(22) Filed: Mar. 11, 2013

Related U.S. Application Data

(60) Provisional application No. 61/736,359, filed on Dec. 12, 2012.

(51) Int. Cl.
*C10G 1/06* (2006.01)
*C10G 1/00* (2006.01)

(52) U.S. Cl.
USPC .......................... 585/241; 585/240; 585/469

(58) Field of Classification Search
USPC ........................................ 585/240, 241, 469
See application file for complete search history.

(56) References Cited

U.S. PATENT DOCUMENTS

| | | | |
|---|---|---|---|
| 2,620,314 A | 12/1952 | Hoekstra | |
| 2,948,675 A | 8/1960 | Case et al. | |
| 3,146,188 A | 8/1964 | Gossett | |
| 3,227,645 A | 1/1966 | Frumkin et al. | |
| 3,658,695 A | 4/1972 | VanPool | |
| 3,839,187 A | 10/1974 | Vanvenrooy | |
| 4,197,192 A | 4/1980 | Gould | |
| 4,310,440 A | 1/1982 | Wilson et al. | |
| 4,354,928 A | 10/1982 | Audeh et al. | |
| 4,440,871 A | 4/1984 | Lok et al. | |
| 4,478,705 A | 10/1984 | Ganguli | |
| 4,483,691 A | 11/1984 | McShea, III et al. | |
| 4,645,589 A | 2/1987 | Krambeck et al. | |
| 4,870,222 A | 9/1989 | Bakas et al. | |
| 5,157,196 A | 10/1992 | Crossland et al. | |
| 5,157,197 A | 10/1992 | Cooper et al. | |
| 5,961,786 A | 10/1999 | Freel et al. | |
| 6,136,290 A | 10/2000 | Benazzi et al. | |
| 6,239,057 B1 | 5/2001 | Ichikawa et al. | |
| 6,426,442 B1 | 7/2002 | Ichikawa et al. | |
| 6,514,479 B1 | 2/2003 | Merlen et al. | |
| 6,613,302 B1 | 9/2003 | Moscoso et al. | |
| 6,627,781 B1 | 9/2003 | Briot et al. | |
| 6,740,788 B1 | 5/2004 | Maher et al. | |
| 6,756,030 B1 | 6/2004 | Rohde et al. | |
| 6,776,975 B2 | 8/2004 | Wilson et al. | |
| 7,374,662 B2 | 5/2008 | Duplan et al. | |
| 7,419,931 B2 | 9/2008 | Serra et al. | |
| 7,575,737 B1 | 8/2009 | Miller et al. | |
| 7,615,143 B2 | 11/2009 | Chen et al. | |
| 7,629,499 B2 | 12/2009 | Serra Alfaro et al. | |
| 7,687,423 B2 | 3/2010 | Moscoso et al. | |
| 7,713,513 B2 | 5/2010 | Jan et al. | |
| 7,982,083 B2 | 7/2011 | Guillon et al. | |
| 8,048,403 B2 | 11/2011 | Miller et al. | |
| 8,134,037 B2 | 3/2012 | Bogdan et al. | |
| 8,178,740 B2 | 5/2012 | Nicholas et al. | |
| 8,183,172 B2 | 5/2012 | Guillon et al. | |
| 8,263,032 B2 | 9/2012 | Andersen et al. | |
| 8,398,955 B2 | 3/2013 | Lai et al. | |
| 8,461,405 B2 | 6/2013 | Sanchez et al. | |
| 2008/0179221 A1 | 7/2008 | Nguyen et al. | |
| 2010/0144513 A1 | 6/2010 | Nicholas et al. | |
| 2010/0144514 A1 | 6/2010 | Nicholas et al. | |
| 2010/0298117 A1 | 11/2010 | Levin et al. | |
| 2011/0174692 A1 | 7/2011 | Negiz et al. | |
| 2011/0178354 A1 | 7/2011 | Negiz et al. | |
| 2011/0178356 A1 | 7/2011 | Negiz et al. | |
| 2012/0024752 A1 | 2/2012 | Chen et al. | |
| 2012/0029257 A1 | 2/2012 | Chen et al. | |
| 2012/0121486 A1 | 5/2012 | Collier et al. | |

FOREIGN PATENT DOCUMENTS

| | | |
|---|---|---|
| CA | 2268803 A1 | 4/1998 |
| CN | 102040459 | 5/2011 |
| DE | 69710612 | 11/2002 |
| GB | 682387 | 11/1952 |
| GB | 915601 | 1/1963 |
| JP | 11253810 | 9/1999 |
| JP | 4595106 | 12/2010 |

(Continued)

OTHER PUBLICATIONS

Hong et al., "Synthesis, Structure Solution, Characterization, and Catalytic Properties of TNU-10: A High-Silica Zeolite with the STI Topology", J. Am. Chem Society, 2004, vol. 126, pp. 5718-5826.
Gramm et al., "Complex zeolite structure solved by combining powder diffraction and electron microscopy", Nature, 2006, vol. 444, pp. 79-81.
Baerlocher et al., "Structure of Polycrystalline Zeolite Catalyst IM-5 Solved by Enhanced Charge Flipping", Science, 2007, vol. 315, pp. 1113-1116.
Rietveld, "A Profile Refinement Method for Nuclear and Magnetic Structures", Journal of Applied Crystallography, 1969, vol. 2, pp. 65-71.

(Continued)

*Primary Examiner* — Thuan D Dang
(74) *Attorney, Agent, or Firm* — Maryann Maas

(57) ABSTRACT

A new family of aluminosilicate zeolites designated UZM-44 has been synthesized. These zeolites are represented by the empirical formula.

$$Na_nM_m^{k+}T_rAl_{1-x}E_xSi_yO_z$$

where "n" is the mole ratio of Na to (Al+E), M represents a metal or metals from zinc, Group 1, Group 2, Group 3 and or the lanthanide series of the periodic table, "m" is the mole ratio of M to (Al+E), "k" is the average charge of the metal or metals M, T is the organic structure directing agent or agents, and E is a framework element such as gallium. The process involves contacting a carbonaceous biomass feedstock with UZM-44 at pyrolysis conditions to produce pyrolysis gases comprising hydrocarbons. The catalyst catalyzes a deoxygenation reaction converting oxygenated hydrocarbons into hydrocarbons and removing the oxygen as carbon oxides and water. A portion of the pyrolysis gases is condensed to produce low oxygen biomass-derived pyrolysis oil.

18 Claims, 3 Drawing Sheets

(56) References Cited

FOREIGN PATENT DOCUMENTS

| KR | 480229 | 3/2005 |
| KR | 2011047178 | 5/2011 |
| KR | 2012023156 | 3/2012 |
| KR | 1174099 | 8/2012 |
| KR | 2012091865 | 8/2012 |
| WO | 9817581 | 4/1998 |
| WO | 2012027034 A2 | 3/2012 |

OTHER PUBLICATIONS

Brunauer et al., "Adsorption of Gases in Multimolecular Layers", J. Am. Chem Society, 1938, vol. 60, pp. 309-319.

Portilla et al., "Structure-reactivity relationship for aromatics transalkylation and isomerization process with TNU-9, MCM-22 and ZSM-5 zeolites, and their industrial implications", Applied Catalysis A: General, 2011, vol. 393, n. 1-2, pp. 257-268.

Serra et al., "A rational design of alkyl-aromatics dealkylation-transalkylation catalysts using C8 and C9 alkyl-aromatics as reactants", Journal of Catalysis, 2004, vol. 227, n. 2, pp. 459-469.

Cejka et al., "Novel zeolites in transformation of aromatic hydrocarbons", King Fahd University of Petroleum and Minerals—18th Annual Saudi-Japan Symposium on Catalysts in Petroleum Refining and Petrochemicals, Nov. 2008, pp. 117-126, Publisher: King Fand Univ. of Petroleum and Minerals Res. Inst.

Bleken et al., "Conversion of methanol over 10-ring zeolites with differing volumes at channel intersections: Comparison of TNU-9, IM-5, ZSM-11 and ZSM-5w", Physical Chemistry Chemical Physics, 2011, vol. 13, n. 7, pp. 2539-2549.

Odedairo et al., "Toluene disproportionation and methylation over zeolites TNU-9, SSZ-33, ZSM-5, and mordenite using different reactor systems", Industrial and Engineering Chemistry Research, 2011, vol. 50, n. 6, pp. 3169-3183.

Corma et al., "IM-5: A highly thermal and hydrothermal shape-selective cracking zeolite", Journal of Catalysis, 2002, vol. 206, n. 1, pp. 125-133.

Jae et al., "Production of green aromatics from catalytic fast pyrolysis of lignocellulosic biomass", 11AIChE—2011 AIChE Annual Meeting, Conference Proceedings, Oct. 16-21 2011, Publisher: American Institute of Chemical Engineers.

Jae et al., "Investigation into the shape selectivity of zeolite catalysts for biomass conversion", Journal of Catalysis, 2011, vol. 279, n. 2, pp. 257-268.

Tukur et al., "Comparison studies of xylene isomerization and disproportionation reactions between SSZ-33, TNU-9, mordenite and ZSM-5 zeolite catalysts", Chemical Engineering Journal, vol. 166, n. 1, pp. 348-357, Jan. 1, 2011.

Hong et al., "Synthesis, crystal structure, characterization, and catalytic properties of TNU-9", Journal of the American Chemical Society, 2007, vol. 129, n. 35, pp. 10870-10885.

Corma et al., "Determination of the pore topology of zeolite IM-5 by means of catalytic test reactions and hydrocarbon adsorption measurements", Journal of Catalysis, 2000, vol. 189, n. 2, pp. 382-394.

Lee et al., "Synthesis, characterization, and catalytic properties of zeolites IM-5 and NU-88", Journal of Catalysis, 2003, vol. 215, n. 1, pp. 151-170.

Palomares et al., "Co-exchanged IM5, a stable zeolite for the selective catalytic reduction of NO in the presence of water and SO2", Industrial and Engineering Chemistry Research, 2003, vol. 42, n. 8, pp. 1538-1542.

He et al., "A theoretical study of the stability of Cu2+ ion in IM-5 zeolite and the interaction of Cu-IM-5 with NO", Microporous and Mesoporous Materials, 2009, vol. 121, n. 1-3, pp. 95-102.

Liu et al., "Synthesis of Mo/TNU-9 (TNU-9 Taejon National University No. 9) catalyst and its catalytic performance in methane non-oxidative aromatization", Energy, 2011, vol. 36, n. 3, pp. 1582-1589.

Liu et al., "Synthesis of Mo/IM-5 catalyst and its catalytic behavior in methane non-oxidative aromatization", Fuel, 2011, vol. 90, n. 4, pp. 1515-1521.

Li et al., "Deep oxidative desulfurization of fuels in redox ionic liquids based on iron chloride", Green Chemistry, 2009, vol. 11, pp. 810-815.

Feng et al., "Application of phosphate ionic liquids in deep desulfurization of fuel", Petrochemical Technology, 2006, vol. 35, pp. 272-276.

Nie et al., "N, N-dialkylimidazolium dialkylphosphate ionic liquids: Their extractive performance for thiophene series compounds from fuel oils versus the length of alkyl group", Fuel Processing Technology, 2008, vol. 89, pp. 978-983.

U.S. Appl. No. 13/792,813, filed Mar. 11, 2013, Nicholas et al.
U.S. Appl. No. 13/714,486, filed Dec. 14, 2012, Nicholas et al.
U.S. Appl. No. 13/714,539, filed Dec. 14, 2012, Nicholas et al.
U.S. Appl. No. 13/714,528, filed Dec. 14, 2012, Nicholas et al.
U.S. Appl. No. 13/714,504, filed Dec. 14, 2012, Nicholas et al.
U.S. Appl. No. 13/793,047, filed Mar. 11, 2013, Miller et al.
U.S. Appl. No. 13/793,105, filed Mar. 11, 2013, Miller et al.
U.S. Appl. No. 13/714,493, filed Dec. 14, 2012, Nicholas et al.
U.S. Appl. No. 13/743,715, filed Jan. 17, 2013, Nicholas et al.
U.S. Appl. No. 13/792,667, filed Mar. 11, 2013, Nicholas et al.
U.S. Appl. No. 13/792,610, filed Mar. 11, 2013, Nicholas et al.

CATALYTIC PYROLYSIS USING UZM-44 ALUMINOSILICATE ZEOLITE

CROSS REFERENCE TO RELATED APPLICATION

This application claims the benefit of priority of U.S. Provisional Application 61/736,359, filed Dec. 12, 2012, the contents of which are hereby incorporated by reference in its entirety.

STATEMENT REGARDING FEDERALLY SPONSORED RESEARCH OR DEVELOPMENT

This invention was made with Government support under ZFT-0-40619-01 awarded by the United States Department of Energy. The Government has certain rights in the invention.

FIELD OF THE INVENTION

This invention relates to a new family of aluminosilicate zeolites designated UZM-44 as the catalytic composite for catalytic pyrolysis of biomass. They are represented by the empirical formula of:

$$Na_nM_m^{k+}T_tAl_{1-x}E_xSi_yO_z$$

where M represents a metal or metals from zinc or Group 1 (IUPAC 1), Group 2 (IUPAC 2), Group 3 (IUPAC 3) or the lanthanide series of the periodic table, T is the organic directing agent or agents derived from reactants R and Q where R is an A,Ω-dihalosubstituted alkane such as 1,5-dibromopentane and Q is at least one neutral amine having 6 or fewer carbon atoms such as 1-methylpyrrolidine. E is a framework element such as gallium.

BACKGROUND OF THE INVENTION

Zeolites are crystalline aluminosilicate compositions which are microporous and which are formed from corner sharing $AlO_2$ and $SiO_2$ tetrahedra. Numerous zeolites, both naturally occurring and synthetically prepared, are used in various industrial processes. Synthetic zeolites are prepared via hydrothermal synthesis employing suitable sources of Si, Al and structure directing agents such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on outside surfaces as well as on internal surfaces within the pore.

A particular zeolite, IM-5, was first disclosed by Benazzi, et al. in 1996 (FR96/12873; WO98/17581) who describe the synthesis of IM-5 from the flexible dicationic structure directing agent, 1,5-bis(N-methylpyrrolidinium)pentane dibromide or 1,6-bis(N-methylpyrrolidinium)hexane dibromide in the presence of sodium. After the structure of IM-5 was solved by Baerlocher et al. (Science, 2007, 315, 113-6), the International Zeolite Structure Commission gave the code of IMF to this zeolite structure type, see Atlas of Zeolite Framework Types. The IMF structure type was found to contain three mutually orthogonal sets of channels in which each channel is defined by a 10-membered ring of tetrahedrally coordinated atoms, however, connectivity in the third dimension is interrupted every 2.5 nm, therefore diffusion is somewhat limited. In addition, multiple different sizes of 10-membered ring channels exist in the structure.

Applicants have successfully prepared a new family of materials designated UZM-44. The topology of the materials is similar to that observed for IM-5. The materials are prepared via the use of a mixture of simple commercially available structure directing agents, such as 1,5-dibromopentane and 1-methylpyrrolidine. UZM-44 may be used as a catalyst in pyrolyzing a carbonaceous biomass feedstock to produce pyrolysis gases comprising hydrocarbons. The catalyst catalyzes a deoxygenation reaction converting at least a portion of the oxygenated hydrocarbons into hydrocarbons and removing the oxygen as carbon oxides and water. A condensable portion of the pyrolysis gases is condensed to low oxygen biomass-derived pyrolysis oil.

SUMMARY OF THE INVENTION

As stated, the present invention relates to using a new catalytic composite comprising a new aluminosilicate zeolite designated UZM-44 in a process for aromatic transalkylation. Accordingly, one embodiment of the invention is a material having a three-dimensional framework of at least $AlO_2$ and $SiO_2$ tetrahedral units and an empirical composition in the as synthesized and anhydrous basis expressed by an empirical formula of:

$$Na_nM_m^{k+}T_tAl_{1-x}E_xSi_yO_z$$

where "n" is the mole ratio of Na to (Al+E) and has a value from approximately 0.05 to 0.5, M represents at least one metal selected from the group consisting of zinc, Group 1 (IUPAC 1), Group 2 (IUPAC 2), Group 3 (IUPAC 3), and the lanthanide series of the periodic table, and any combination thereof, "m" is the mole ratio of M to (Al+E) and has a value from 0 to 0.5, "k" is the average charge of the metal or metals M, T is the organic structure directing agent or agents derived from reactants R and Q where R is an A,Ω-dihalogen substituted alkane having 5 carbon atoms and Q is at least one neutral monoamine having 6 or fewer carbon atoms, "t" is the mole ratio of N from the organic structure directing agent or agents to (Al+E) and has a value of from about 0.5 to about 1.5, E is an element selected from the group consisting of gallium, iron, boron and combinations thereof, "x" is the mole fraction of E and has a value from 0 to about 1.0, "y" is the mole ratio of Si to (Al+E) and varies from greater than 9 to about 25 and "z" is the mole ratio of O to (Al+E) and has a value determined by the equation:

$$z=(n+k\cdot m+3+4\cdot y)/2$$

Another embodiment of the catalytic composite of the invention is a microporous crystalline zeolite having a three-dimensional framework of at least $AlO_2$ and $SiO_2$ tetrahedral units and an empirical composition in the as synthesized and anhydrous basis expressed by an empirical formula of:

$$Na_nM_m^{k+}T_tAl_{1-x}E_xSi_yO_z$$

where "n" is the mole ratio of Na to (Al+E) and has a value from approximately 0.05 to 0.5, M represents a metal or metals from Group 1 (IUPAC 1), Group 2 (IUPAC 2), Group 3 (IUPAC 3), the lanthanide series of the periodic table or zinc, "m" is the mole ratio of M to (Al+E) and has a value from 0 to 0.5, "k" is the average charge of the metal or metals M, T is the organic structure directing agent or agents derived from reactants R and Q where R is an A,Ω-dihalogen substituted alkane having 5 carbon atoms and Q is at least one neutral monoamine having 6 or fewer carbon atoms, "t" is the mole ratio of N from the organic structure directing agent or agents to (Al+E) and has a value of from 0.5 to 1.5, E is an element selected from the group consisting of gallium, iron, boron and combinations thereof, "x" is the mole fraction of E and has a value from 0 to about 1.0, "y" is the mole ratio of Si to (Al+E) and varies from greater than 9 to about 25 and "z" is the mole ratio of O to (Al+E) and has a value determined by the equation:

$$z=(n+k \cdot m+3+4 \cdot y)/2$$

and the zeolite is characterized in that it has the x-ray diffraction pattern having at least the d-spacings and intensities set forth in Table A. The zeolite is thermally stable up to a temperature of greater than 600° C. in one embodiment and at least 800° C. in another embodiment.

The catalytic composite of the invention may be prepared by a process comprising forming a reaction mixture containing reactive sources of Na, R, Q, Al, Si and optionally E and/or M and heating the reaction mixture at a temperature of about 160° C. to about 180° C., or about 165° C. to about 175° C., for a time sufficient to form the zeolite. The reaction mixture has a composition expressed in terms of mole ratios of the oxides of:

$$a\text{-}b\text{Na}_2\text{O}{:}b\text{M}_{n/2}\text{O}{:}c\text{RO}{:}d\text{Q}{:}1\text{-}e\text{Al}_2\text{O}_3{:}e\text{E}_2\text{O}_3{:}f\text{Si} \\ \text{O}_2{:}g\text{H}_2\text{O}$$

where "a" has a value of about 10 to about 30, "b" has a value of 0 to about 30, "c" has a value of about 1 to about 10, "d" has a value of about 2 to about 30, "e" has a value of 0 to about 1.0, "f" has a value of about 30 to about 100, "g" has a value of about 100 to about 4000. With this number of reactive reagent sources, many orders of addition can be envisioned. Typically, the aluminum reagent is dissolved in the sodium hydroxide prior to adding the silica reagents. Reagents R and Q can be added together or separately in many different orders of addition.

The invention uses UZM-44 as the catalyst or a catalyst component in a process of catalytically pyrolyzing a carbonaceous biomass feedstock to produce pyrolysis gases comprising hydrocarbons. The catalyst catalyzes a deoxygenation reaction converting at least a portion of the oxygenated hydrocarbons into hydrocarbons and removing the oxygen as carbon oxides and water. A condensable portion of the pyrolysis gases is condensed to low oxygen biomass-derived pyrolysis oil.

DETAILED DESCRIPTION OF THE INVENTION

Figure 1:
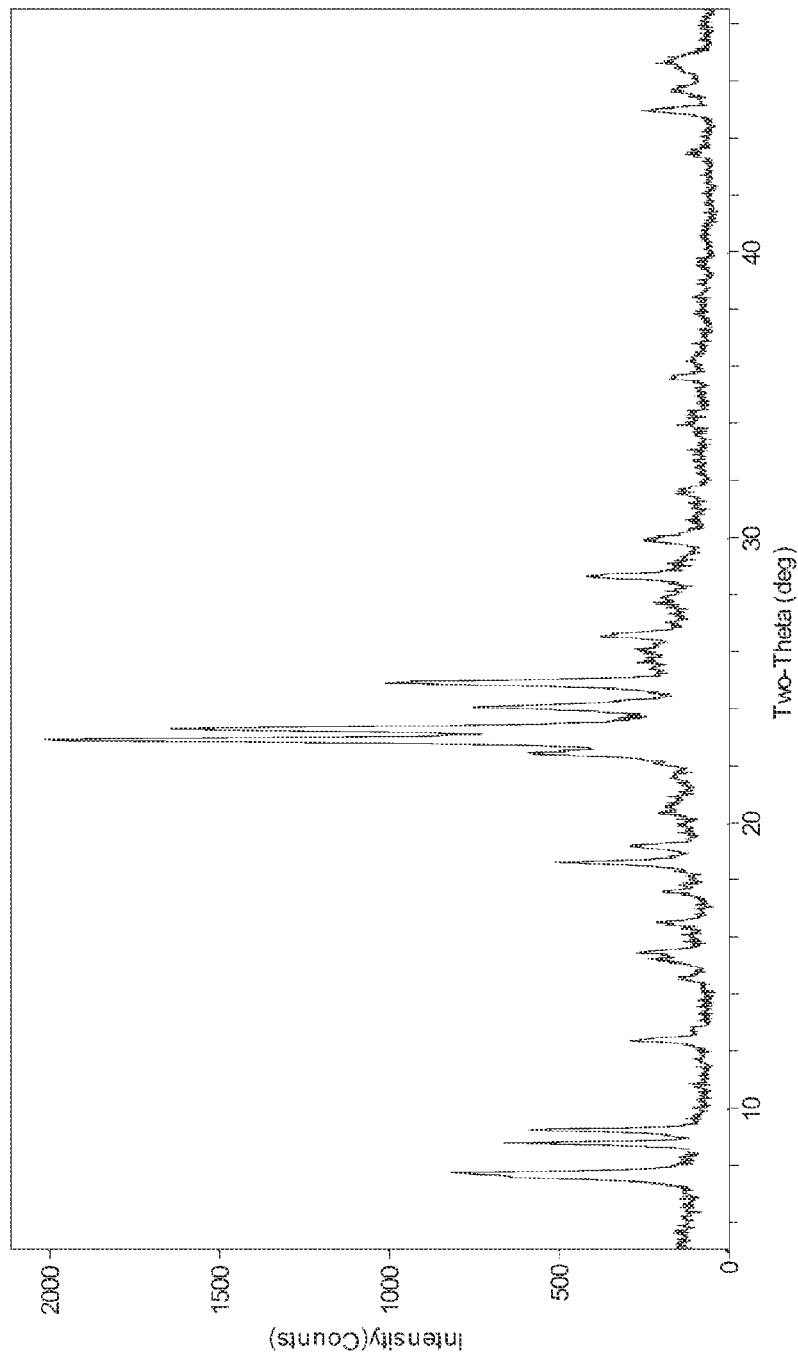
FIG. 1 is an XRD pattern of the UZM-44 zeolite formed in Example 1. This pattern shows the UZM-44 zeolite in the as-synthesized form.
Figure 2:
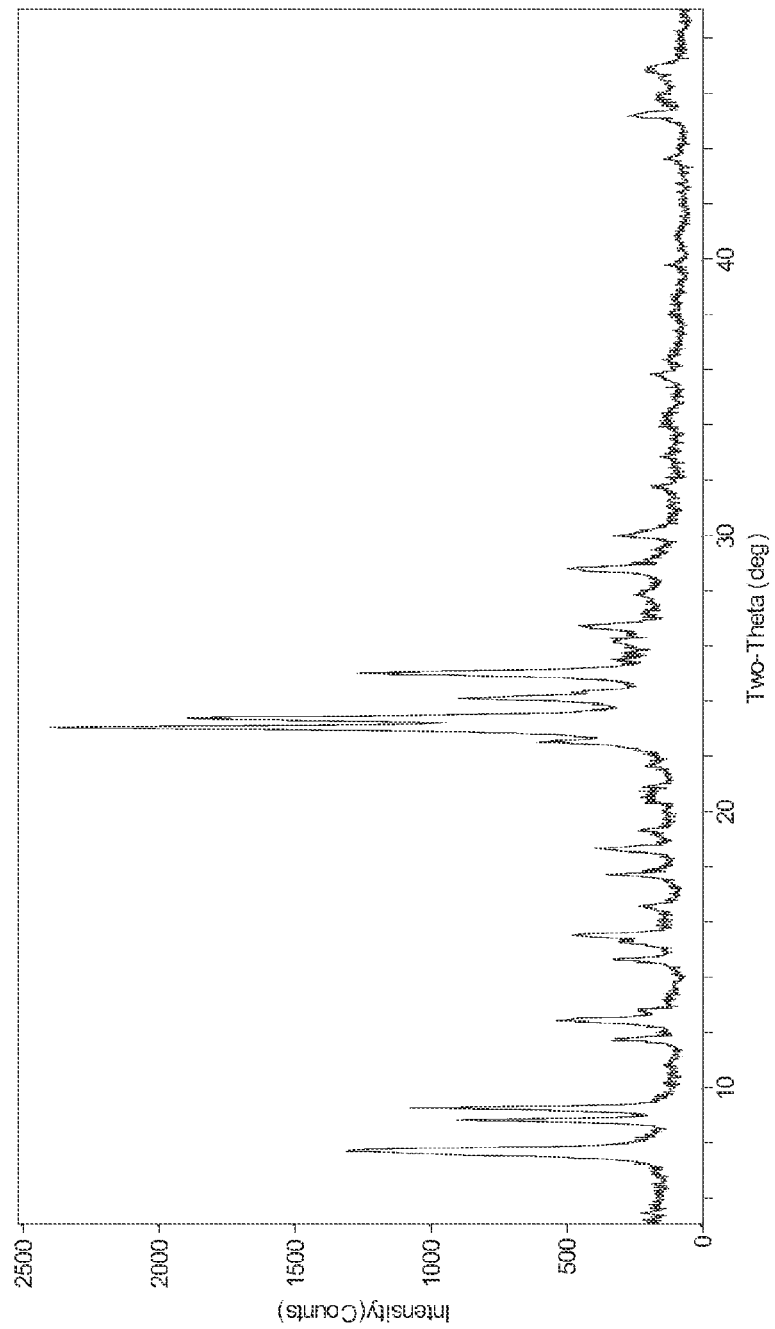
FIG. 2 is also an XRD pattern of the UZM-44 zeolite formed in Example 1. This pattern shows the UZM-44 zeolite in the H+ form.

Applicants have prepared a catalytic component suitable for catalyzing the pyrolysis of carbonaceous biomass where the catalytic component is an aluminosilicate zeolite whose topological structure is related to IMF as described in Atlas of Zeolite Framework Types, which is maintained by the International Zeolite Association Structure Commission at http://www.iza-structure.org/databases/, the member of which has been designated IM-5. As will be shown in detail, UZM-44 is different from IM-5 in a number of its characteristics including its micropore volume. The instant microporous crystalline zeolite, UZM-44, has an empirical composition in the as synthesized and anhydrous basis expressed by an empirical formula of:

$$\text{Na}_n\text{M}_m^{k+}\text{T}_t\text{Al}_{1-x}\text{E}_x\text{Si}_y\text{O}_z$$

where "n" is the mole ratio of Na to (Al+E) and has a value from approximately 0.05 to 0.5, M represents a metal or metals selected from the group consisting of zinc, Group 1 (IUPAC 1), Group 2 (IUPAC 2), Group 3 (IUPAC 3), the lanthanide series of the periodic table, and any combination thereof, "m" is the mole ratio of M to (Al+E) and has a value from 0 to 0.5, "k" is the average charge of the metal or metals M, T is the organic structure directing agent or agents derived from reactants R and Q where R is an A,Ω-dihalogen substituted alkane having 5 carbon atoms and Q is at least one neutral monoamine having 6 or fewer carbon atoms, "t" is the mole ratio of N from the organic structure directing agent or agents to (Al+E) and has a value of from 0.5 to 1.5, E is an element selected from the group consisting of gallium, iron, boron and combinations thereof, "x" is the mole fraction of E and has a value from 0 to about 1.0, "y" is the mole ratio of Si to (Al+E) and varies from greater than 9 to about 25 and "z" is the mole ratio of O to (Al+E) and has a value determined by the equation:

$$z=(n+k \cdot m+3+4 \cdot y)/2$$

Where M is only one metal, then the weighted average valence is the valence of that one metal, i.e. +1 or +2. However, when more than one M metal is present, the total amount of:

$$\text{M}_m^{k+} = \text{M}_{m1}^{(k1)+} + \text{M}_{m2}^{(k2)+} + \text{M}_{m3}^{(k3)+} + \text{M}_{m4}^{(k4)+} + \ldots$$

and the weighted average valence "k" is given by the equation:

$$k = \frac{m1 \cdot k1 + m2 \cdot k2 + m3 \cdot k3 \ldots}{m1 + m2 + m3 \ldots}$$

In one embodiment, the microporous crystalline zeolite, UZM-44, is synthesized by a hydrothermal crystallization of a reaction mixture prepared by combining reactive sources of sodium, organic structure directing agent or agents T, aluminum, silicon, and optionally E, M, or both. The reaction mixture does not comprise seeds of a layered material L. The sources of aluminum include but are not limited to aluminum alkoxides, precipitated aluminas, aluminum metal, aluminum hydroxide, sodium aluminate, aluminum salts and alumina sols. Specific examples of aluminum alkoxides include, but are not limited to aluminum sec-butoxide and aluminum ortho isopropoxide. Sources of silica include but are not limited to tetraethylorthosilicate, colloidal silica, precipitated silica and alkali silicates. Sources of sodium include but are not limited to sodium hydroxide, sodium bromide, sodium aluminate, and sodium silicate.

T is the organic structure directing agent or agents derived from reactants R and Q where R is an A,Ω-dihalogen substituted alkane having 5 carbon atoms and Q comprises at least one neutral monoamine having 6 or fewer carbon atoms. R may be an A,Ω-dihalogen substituted alkane having 5 carbon atoms selected from the group consisting of 1,5-dichloropentane, 1,5-dibromopentane, 1,5-diiodopentane, and combinations thereof. Q comprises at least one neutral monoamine having 6 or fewer carbon atoms such as 1-ethylpyrrolidine, 1-methylpyrrolidine, 1-ethylazetidine, 1-methylazetidine, triethylamine, diethylmethylamine, dimethylethylamine, trimethylamine, dimethylbutylamine, dimethylpropylamine, dimethylisopropylamine, methylethylpropylamine, methylethylisopropylamine, dipropylamine, diisopropylamine, cyclopentylamine, methylcyclopentylamine, hexamethyleneimine. Q may comprise combinations of multiple neutral monoamines having 6 or fewer carbon atoms.

M represents at least one exchangeable cation of a metal or metals from Group 1 (IUPAC 1), Group 2 (IUPAC 2), Group 3 (IUPAC 3) or the lanthanide series of the periodic table and or zinc. Specific examples of M include but are not limited to lithium, potassium, rubidium, cesium, magnesium, calcium, strontium, barium, zinc, yttrium, lanthanum, gadolinium, and mixtures thereof. Reactive sources of M include, but are not limited to, the group consisting of halide, nitrate, sulfate, hydroxide, or acetate salts. E is an element selected from the group consisting of gallium, iron, boron and combinations thereof, and suitable reactive sources include, but are not limited to, boric acid, gallium oxyhydroxide, gallium nitrate, gallium sulfate, ferric nitrate, ferric sulfate, ferric chloride and mixtures thereof.

The reaction mixture containing reactive sources of the desired components can be described in terms of molar ratios of the oxides by the formula:

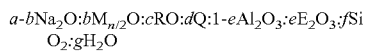

$$a\text{-}b\mathrm{Na_2O}\text{:}b\mathrm{M}_{n/2}\mathrm{O}\text{:}c\mathrm{RO}\text{:}d\mathrm{Q}\text{:}1\text{-}e\mathrm{Al_2O_3}\text{:}e\mathrm{E_2O_3}\text{:}f\mathrm{SiO_2}\text{:}g\mathrm{H_2O}$$

where "a" has a value of about 10 to about 30, "b" has a value of 0 to about 30, "c" has a value of about 1 to about 10, "d" has a value of about 2 to about 30, "e" has a value of 0 to about 1.0, "f" has a value of about 30 to about 100, "g" has a value of about 100 to about 4000. The examples demonstrate specific orders of addition for the reaction mixture which leads to UZM-44. However, as there are at least 6 starting materials, many orders of addition are possible. Also, if alkoxides are used, it is preferred to include a distillation or evaporative step to remove the alcohol hydrolysis products. While the organic structure directing agents R and Q can be added separately or together to the reaction mixture at a number of points in the process, it is preferred to mix R and Q together at room temperature and add the combined mixture to a cooled mixture of reactive Si, Al and Na sources maintained at 0-10° C. Alternatively, the mixture of R and Q, after mixing at room temperature, could be cooled and the reactive sources of Si, Al, and Na added to the organic structure directing agent mixture while maintaining a temperature of 0-10° C. In an alternative embodiment, the reagents R and Q could be added, separately or together, to the reaction mixture at room temperature.

The reaction mixture is then reacted at a temperature of about 160° C. to about 180° C., or about 165° C. to about 175° C., for a period of about 1 day to about 3 weeks and preferably for a time of about 3 days to about 14 days in a stirred, sealed reaction vessel under autogenous pressure. Static crystallization does not yield UZM-44. After crystallization is complete, the solid product is isolated from the heterogeneous mixture by means such as filtration or centrifugation, and then washed with deionized water and dried in air at ambient temperature up to about 100° C.

The as-synthesized UZM-44 is characterized by the x-ray diffraction pattern, having at least the d-spacings and relative intensities set forth in Table A below. Diffraction patterns herein were obtained using a typical laboratory powder diffractometer, utilizing the $K_\alpha$ line of copper; Cu K alpha. From the position of the diffraction peaks represented by the angle 2theta, the characteristic interplanar distances $d_{hkl}$ of the sample can be calculated using the Bragg equation. The intensity is calculated on the basis of a relative intensity scale attributing a value of 100 to the line representing the strongest peak on the X-ray diffraction pattern, and then: very weak (vw) means less than 5; weak (w) means less than 15; medium (m) means in the range 15 to 50; strong (s) means in the range 50 to 80; very strong (vs) means more than 80. Intensities may also be shown as inclusive ranges of the above. The X-ray diffraction patterns from which the data (d spacing and intensity) are obtained are characterized by a large number of reflections some of which are broad peaks or peaks which form shoulders on peaks of higher intensity. Some or all of the shoulders may not be resolved. This may be the case for samples of low crystallinity, of particular coherently grown composite structures or for samples with crystals which are small enough to cause significant broadening of the X-rays. This can also be the case when the equipment or operating conditions used to produce the diffraction pattern differ significantly from those used in the present case.

The X-ray diffraction pattern for UZM-44 contains many peaks, an example of the x-ray diffraction patterns for an as-synthesized UZM-44 product is shown in FIG. 1. Those peaks characteristic of UZM-44 are shown in Table A. Additional peaks, particularly those of very weak intensity, may also be present. All peaks of medium or higher intensity present in UZM-44 are represented in Table A.

The zeolite may be further characterized by the x-ray diffraction pattern having at least the d-spacings and intensities set forth in Table A.

TABLE A

| 2-Theta | d(†) | I/Io % |
|---------|------|--------|
| 7.72 | 11.45 | m |
| 8.88 | 9.95 | m |
| 9.33 | 9.47 | m |
| 12.47 | 7.09 | w-m |
| 12.85 | 6.88 | vw |
| 14.62 | 6.05 | vw-w |
| 15.27 | 5.80 | w |
| 15.57 | 5.68 | w |
| 16.60 | 5.34 | w |
| 17.70 | 5.01 | vw-w |
| 18.71 | 4.74 | w-m |
| 19.30 | 4.59 | w |
| 22.55 | 3.94 | m |
| 23.03 | 3.86 | vs |
| 23.39 | 3.80 | s |
| 24.17 | 3.68 | m |
| 25.01 | 3.56 | m |
| 26.19 | 3.40 | vw-w |
| 26.68 | 3.34 | w-m |
| 28.76 | 3.10 | w-m |
| 30.07 | 2.97 | w |
| 35.72 | 2.51 | vw-w |
| 45.08 | 2.01 | w |
| 45.83 | 1.98 | vw-w |
| 46.77 | 1.94 | vw-w |

As will be shown in detail in the examples, the UZM-44 material is thermally stable up to a temperature of at least 600° C. and in another embodiment, up to at least 800° C. Also as shown in the examples, the UZM-44 material may have a micropore volume as a percentage of total pore volume of less than 60%.

Characterization of the UZM-44 product by high-resolution scanning electron microscopy shows that the UZM-44 forms in lathes which assemble into rectangular rod colonies.

As synthesized, the UZM-44 material will contain some exchangeable or charge balancing cations in its pores. These exchangeable cations can be exchanged for other cations, or in the case of organic cations, they can be removed by heating under controlled conditions. It is also possible to remove some organic cations from the UZM-44 zeolite directly by ion exchange. The UZM-44 zeolite may be modified in many ways to tailor it for use in a particular application. Modifications include calcination, ion-exchange, steaming, various acid extractions, ammonium hexafluorosilicate treatment, or any combination thereof, as outlined for the case of UZM-4M in U.S. Pat. No. 6,776,975 B1 which is incorporated by reference in its entirety. Conditions may be more severe than shown in U.S. Pat. No. 6,776,975. Properties that are modified include porosity, adsorption, Si/Al ratio, acidity, thermal stability, and the like.

After calcination, ion-exchange and calcination and on an anhydrous basis, the microporous crystalline zeolite UZM-44 has a three-dimensional framework of at least $AlO_2$ and $SiO_2$ tetrahedral units and an empirical composition in the hydrogen form expressed by an empirical formula of

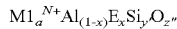

$$M1_a^{N+}Al_{(1-x)}E_xSi_{y'}O_{z''}$$

where M1 is at least one exchangeable cation selected from the group consisting of alkali, alkaline earth metals, rare earth metals, ammonium ion, hydrogen ion and combinations thereof, "a" is the mole ratio of M1 to (Al+E) and varies from about 0.05 to about 50, "N" is the weighted average valence of M1 and has a value of about +1 to about +3, E is an element selected from the group consisting of gallium, iron, boron, and combinations thereof, x is the mole fraction of E and varies from 0 to 1.0, y' is the mole ratio of Si to (Al+E) and varies from greater than about 9 to virtually pure silica and z" is the mole ratio of O to (Al+E) and has a value determined by the equation:

$$z''=(a \cdot N+3+4 \cdot y')/2$$

In the hydrogen form, after calcination, ion-exchange and calcination to remove $NH_3$, UZM-44 displays the x-ray diffraction pattern having at least the d-spacings and intensities set forth in Table B. Those peaks characteristic of UZM-44 are shown in Tables B. Additional peaks, particularly those of very weak intensity, may also be present. All peaks of medium or higher intensity present in UZM-44 are indicated in Table B.

TABLE B

| 2-Theta | d(Å) | I/Io % |
|---|---|---|
| 7.71 | 11.47 | m-s |
| 8.84 | 10.00 | m-s |
| 9.24 | 9.56 | m |
| 11.76 | 7.52 | vw-w |
| 12.46 | 7.10 | m |
| 14.38 | 6.15 | vw |
| 14.64 | 6.05 | w |
| 15.26 | 5.80 | w |
| 15.52 | 5.70 | w-m |
| 16.58 | 5.34 | w |
| 17.72 | 5.00 | w-m |
| 18.64 | 4.76 | w |
| 22.56 | 3.94 | w-m |
| 23.06 | 3.85 | vs |
| 23.40 | 3.80 | s |
| 24.12 | 3.69 | m |
| 25.06 | 3.55 | m |

TABLE B-continued

| 2-Theta | d(Å) | I/Io % |
|---|---|---|
| 26.16 | 3.40 | vw-w |
| 26.74 | 3.33 | w-m |
| 28.82 | 3.10 | w-m |
| 30.12 | 2.96 | w |
| 35.86 | 2.50 | vw-w |
| 45.32 | 2.00 | w |
| 46.05 | 1.97 | vw-w |
| 46.92 | 1.93 | vw-w |

Similar to the as-synthesized material, the modified UZM-44 materials are thermally stable up to a temperature of at least 600° C. and in another embodiment, up to at least 800° C. and may have a micropore volume as a percentage of total pore volume of less than 60%.

Figure 3:
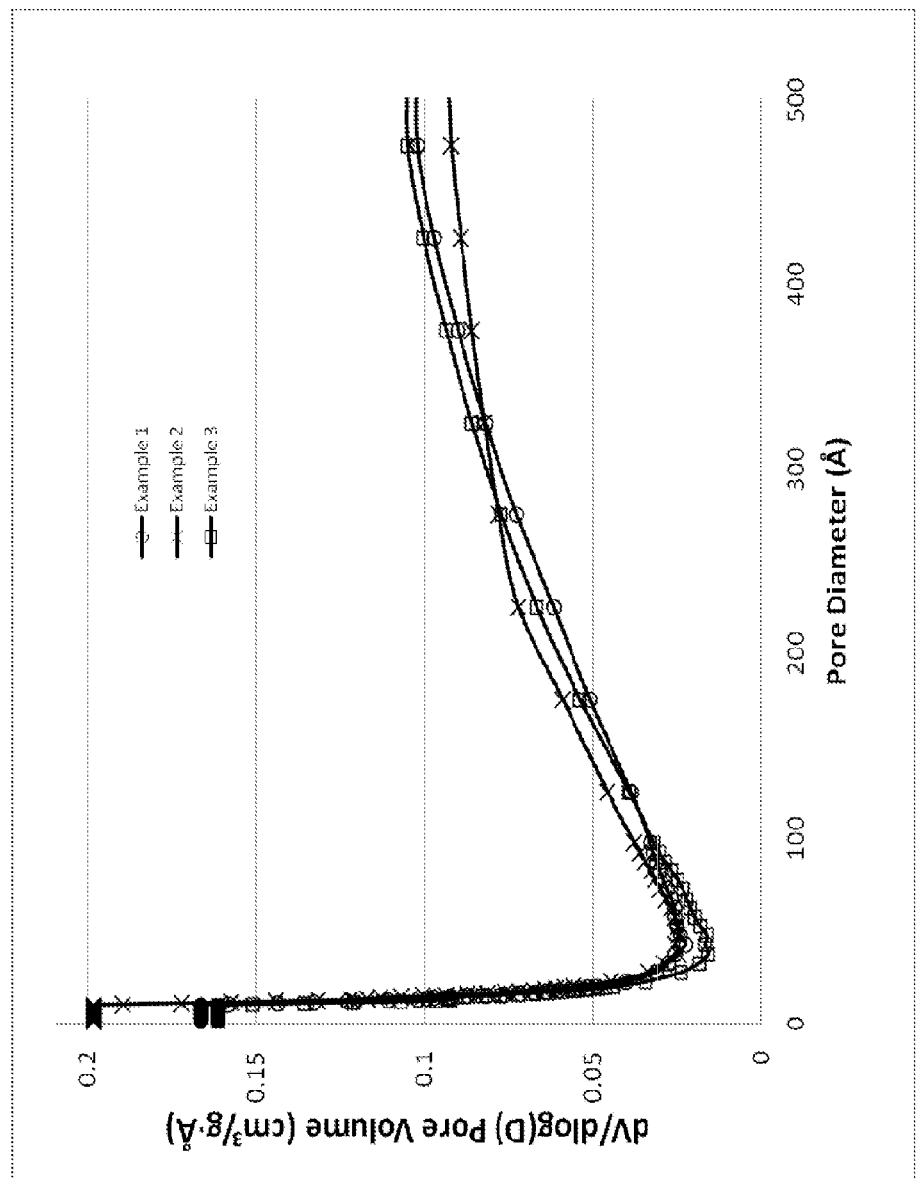
FIG. 3 is a plot derived from the N₂ BET experiment where dV/dlog(D) is plotted against the pore diameter. This plot shows the incremental amount of nitrogen adsorbed at each pore diameter measured.

Surface area, micropore volume and total pore volume may be determined, for example, by $N_2$ adsorption using the conventional BET method of analysis (J. Am. Chem. Soc., 1938, 60, 309-16) coupled with t-plot analysis of the adsorption isotherm as implemented in Micromeritics ASAP 2010 software. The t-plot is a mathematical representation of multi-layer adsorption and allows determination of the amount of $N_2$ adsorbed in the micropores of the zeolitic material under analysis. In particular, for the materials described herein, points at 0.45, 0.50, 0.55, 0.60, and 0.65 $P/P_0$ are used to determine the slope of the t-plot line, the intercept of which is the micropore volume. Total pore volume is determined at 0.98 $P/P_0$. The UZM-44 of the instant invention has a micropore volume of less than 0.155 mL/g, typically less than 0.150 mL/g and often less than 0.145 mL/g. Additionally, by looking at the dV/dlog D versus pore diameter plot (the differential volume of nitrogen adsorbed as a function of pore diameter), as shown in FIG. 3, the UZM-44 of the instant invention contains no feature at around 200-300 Å. As can be seen in FIG. 3, the material of Example 2, not in accordance with the invention, does contain a feature at around 200-300 Å. Instead, UZM-44 has an adsorption feature occurring at greater than 450 Å. In an embodiment, greater than 0.1 mL $N_2/g$Å is differentially adsorbed at a pore diameter of 475 Å. Preferably, greater than 0.1 mL $N_2/g$Å is differentially adsorbed at pore diameters greater than 475 Å where differentially adsorbed indicates the differential volume of nitrogen adsorbed at a particular pore diameter.

By virtually pure silica is meant that virtually all the aluminum and/or the E metals have been removed from the framework. It is well known that it is virtually impossible to remove all the aluminum and/or E metal. Numerically, a zeolite is virtually pure silica when y' has a value of at least 3,000, preferably 10,000 and most preferably 20,000. Thus, ranges for y' are from 9 to 3,000; from greater than 20 to about 3,000; from 9 to 10,000; from greater than 20 to about 10,000; from 9 to 20,000; and from greater than 20 to about 20,000.

In specifying the proportions of the zeolite starting material or adsorption properties of the zeolite product and the like herein, the "anhydrous state" of the zeolite will be intended unless otherwise stated. The term "anhydrous state" is employed herein to refer to a zeolite substantially devoid of both physically adsorbed and chemically adsorbed water.

The UZM-44 zeolite may be used as the catalyst in processes to produce low oxygen biomass-derived pyrolysis oils. The low oxygen biomass-derived pyrolysis oils produced are substantially fully hydrocarbon products (i.e., products comprising only hydrogen and carbon atoms) making them more suitable for processing into biofuels and chemicals. The methods comprise pyrolyzing carbonaceous biomass feedstock in the presence of the UZM-44 catalyst whereby oxygenated hydrocarbons produced as pyrolysis intermediates are substantially deoxygenated to yield substantially fully hydrocarbon pyrolysis gases, a condensable portion of which is condensed into low oxygen-biomass derived pyrolysis oil. "Hydrocarbons" as used herein are organic compounds that contain principally hydrogen and carbon, i.e., "hydrocarbons" are oxygen-free. "Hydrocarbons" include both aromatic and non-aromatic hydrocarbons. Exemplary aromatic hydrocarbons include benzene, toluene, ethylbenzene, p-xylene, and o-xylene. "Oxygenated hydrocarbons" as used herein are organic compounds containing hydrogen, carbon, and oxygen. Exemplary oxygenated hydrocarbons produced from pyrolysis include carboxylic acids such as acetic acid, phenols, cresols, and aldehydes such as furfural, levoglucosan, etc. It should be appreciated that while the oil produced according to exemplary embodiments of the present invention is generally described herein as a "low oxygen biomass-derived pyrolysis oil", this term generally includes any oil produced having a lower oxygen concentration than conventional biomass-derived pyrolysis oil. Conventional biomass-derived pyrolysis oil can contain over 40% by weight oxygen from these oxygenated hydrocarbons and typically has high acidity (with a low pH and high total acid number (TAN)) making it corrosive to storage, pipes, and downstream equipment, with low energy density and susceptibility to increased viscosity over time. Conventional biomass-derived pyrolysis oil typically has a pH of <3 and a TAN>150. The term "low oxygen biomass-derived pyrolysis oil" includes oil having no oxygen.

The microporous crystalline zeolite as outlined above, or a modification thereof, maybe in a composite with commonly known binders. The UZM-44 preferably is mixed with a binder for convenient formation of catalyst particles in a proportion of about 5 to 100 mass % UZM-44 zeolite and 0 to 95 mass-% binder, with the UZM-44 zeolite preferably comprising from about 10 to 90 mass-% of the composite. The binder should preferably be porous, have a surface area of about 5 to about 800 m$^2$/g, and be relatively refractory to the conditions utilized in the catalytic pyrolysis process. Non-limiting examples of binders are alumina, titania, zirconia, zinc oxide, magnesia, boria, silica-alumina, silica-magnesia, chromia-alumina, alumina-boria, aluminophosphates, silica-zirconia, silica, silica gel, and clays. Preferred binders are amorphous silica and alumina, including gamma-, eta-, and theta-alumina, with gamma- and eta-alumina being especially preferred.

The zeolite with or without a binder can be formed into various shapes such as pills, pellets, extrudates, spheres, etc. Preferred shapes are extrudates and spheres. Extrudates are prepared by conventional means which involves mixing of the composition either before or after adding metallic components, with the binder and a suitable peptizing agent to form a homogeneous dough or thick paste having the correct moisture content to allow for the formation of extrudates with acceptable integrity to withstand direct calcination. The dough then is extruded through a die to give the shaped extrudate. A multitude of different extrudate shapes are possible, including, but not limited to, cylinders, cloverleaf, dumbbell and symmetrical and asymmetrical polylobates. It is also within the scope of this invention that the extrudates may be further shaped to any desired form, such as spheres, by any means known to the art.

Spheres can be prepared by the well known oil-drop method which is described in U.S. Pat. No. 2,620,314 which is incorporated by reference. The method involves dropping a mixture of zeolite, and for example, alumina sol, and gelling agent into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 50 to about 200° C. and subjected to a calcination procedure at a temperature of about 450 to about 700° C. for a period of about 1 to about 20 hours. This treatment effects conversion of the hydrogel to the corresponding matrix.

One embodiment of the invention of a process for producing low oxygen biomass-derived pyrolysis oil begins by introducing carbonaceous biomass feedstock (hereinafter "biomass") into a pyrolysis reactor and pyrolyzing the biomass in the presence of the UZM-44 catalyst. Various types of biomass may be pyrolyzed. Virtually any form of biomass can be considered for pyrolysis to produce biomass-derived pyrolysis oil. Biomass-derived pyrolysis oil may be derived from biomass material such as wood, agricultural wastes/residues, nuts and seeds, algae, grasses, forestry byproducts, cellulose and lignin, municipal waste, construction/demolition debris, or the like. The moisture in the biomass may be reduced by known drying methods prior to introduction into the pyrolysis reactor. Grinding of the biomass may also be performed prior to pyrolysis. The step of pyrolyzing the carbonaceous biomass feedstock in the presence of the UZM-44 catalyst comprises contacting the carbonaceous biomass feedstock and/or pyrolysis gases with the UZM-44 catalyst.

The pyrolysis process produces a carbon-containing solid (char), and pyrolysis gases comprising a variety of oxygenated hydrocarbons, heavy hydrocarbons which include partially depolymerized biomass and light ($C_1$-$C_4$) hydrocarbons, carbon oxides such as carbon dioxide and carbon monoxide (collectively "carbon oxides"), hydrogen gas, and steam. The pyrolysis gases comprise a condensable portion (vapors) and a non-condensable portion as hereinafter described. The oxygenated hydrocarbons include carboxylic acids, phenols, cresols, aldehydes, etc. that may contribute to the thermal instability and corrosivity of conventional pyrolysis products.

At pyrolysis temperatures of about 300° C. to about 800° C., the UZM-44 catalyst catalyzes a deoxygenation reaction converting at least a portion of the biomass into hydrocarbons. The biomass is first pyrolyzed into oxygenated hydrocarbons. The oxygen contained in the oxygenated hydrocarbons is then removed as carbon oxides and water. The oxygenated hydrocarbons are substantially deoxygenated by the UZM-44 catalyst; however, less than complete deoxygenation may occur. Any oxygenated hydrocarbons remaining in the pyrolysis gases after pyrolysis are referred to herein as "residual oxygenated hydrocarbons." Residual oxygenated hydrocarbons having relatively high carbon/oxygen ratio may also be desirable. The pyrolysis and deoxygenation occur substantially simultaneously in the pyrolysis reactor.

The biomass may be pyrolyzed using various pyrolysis methods including fast pyrolysis and other pyrolysis methods such as vacuum pyrolysis, slow pyrolysis, and others. Fast pyrolysis includes rapidly imparting a relatively high temperature to feedstocks for a very short residence time, typically about 0.5 seconds to about 0.5 minutes, and then rapidly reducing the temperature of the pyrolysis products before chemical equilibrium can occur. By this approach, the complex structures of the biomass are broken into reactive chemical fragments that are initially formed by depolymerization and volatilization reactions, but do not persist for any significant length of time. Fast pyrolysis is an intense, short duration process that can be carried out in a variety of pyrolysis reactors such as fixed bed pyrolysis reactors, fluidized bed pyrolysis reactors, circulating fluidized bed reactors (CFBR), or other pyrolysis reactors capable of fast pyrolysis as known in the art. For example, in an exemplary fluidized bed pyrolysis reactor, carbonaceous biomass feedstock is thermally converted (i.e., pyrolyzed) at pyrolysis temperatures (about 300° C. to about 800° C.) in the presence of a heat transfer medium.

The heat transfer medium comprises the UZM-44 catalyst or a combination of the UZM-44 catalyst and an inert solid such as sand. The UZM-44 catalyst, with or without inorganic inert solids such as sand, comprises the heat transfer medium for a fast pyrolysis process as previously described. The particle size of the heat transfer medium is typically 40-500 micron. However, the heat required to drive the pyrolysis process may be derived from other sources (e.g., an organic heat source such as char) as well known in the art. The heat transfer medium may be provided in a fluidized state and maintained at a temperature suitable for pyrolysis to pyrolyze the carbonaceous biomass feedstock. In one embodiment, the ratio of heat transfer medium to biomass is greater than 8 by mass and preferably greater than 12. The ratio of UZM-44 catalyst to biomass is from 0.1 to 200 by mass. Preferably, the ratio of catalyst to biomass is from 0.1 to 50 by mass and can be from 0.1 to 12 by mass. In one embodiment, the heat transfer medium may be fluidized by a fluidizing gas. Flue gases from the pyrolysis reactor or a non-condensable portion of the pyrolysis gases may be compressed and fed into the pyrolysis reactor as a fluidizing gas for bed fluidization. The heat transfer medium forms a fluidized bed within the pyrolysis reactor.

Once the carbonaceous biomass feedstock has been pyrolyzed, solid carbon-containing char and pyrolysis gases comprising the condensable portion (vapors) and the non-condensable portion exit the pyrolysis reactor. The solid char may be separated from the pyrolysis gases. The spent heat transfer medium comprising the UZM-44 catalyst, the inert solids, or both, are separated from the pyrolysis gases and may be regenerated. The spent heat transfer medium and solid char may also be concurrently separated from the pyrolysis gases.

A circulating fluidizing bed reactor (CFBR) is a preferred pyrolysis reactor. One such circulating bed transport reactor for use in fast pyrolysis is described, for example, in U.S. Pat. No. 5,961,786. There, the carbonaceous biomass feedstock, typically less than 6 mm in size, essentially oxygen-free fluidizing gas, and a heat transfer medium are rapidly mixed in a thermal mixing section of a pyrolysis reactor base section, then transported upward through an entrained-bed tubular reactor. After fast pyrolysis, a cyclonic hot solids recirculation system separates the solid heat transfer medium from the non-condensable pyrolysis gases and condensable pyrolysis gases (vapors) and returns the heat transfer medium to the mixing section to be used again. The heat required to drive the pyrolysis process is transferred to the mixing and reaction zones principally by recirculated heat transfer medium. Typically, there is no oxidation (combustion) occurring in the mixing and reaction zones to supply direct process heat as preferably there is very little oxygen present. Direct or indirect combustion of char or gas, or externally supplied fuel, or indirect electrical resistance heating may be employed to heat the recirculated heat transfer medium before injection into the mixing section. It is to be understood that the fast pyrolysis methods described above are exemplary. In addition, while mixing of the carbonaceous biomass feedstock with a heat transfer medium in the mixing section of a pyrolysis reactor has been described, the carbonaceous biomass feedstock may be mixed with the heat transfer medium prior to introduction into the pyrolysis reactor. The catalyst may alternatively be finely ground and used in a Fluid Catalytic Cracking (FCC) unit fed with the biomass.

The process continues with condensing the condensable portion (vapors) of the pyrolysis gases. The pyrolysis gases are passed to a condenser or series of condensers with the non-condensable portion. The non-condensable portion may be recovered for other uses. The non-condensable portion of the pyrolysis gases comprises hydrogen gas, methane, and carbon oxides which may be separated from each other by methods well known in the art. Ash-laden flue gas from the pyrolysis reactor is transferred from the reheater to a separation apparatus for separation of the ash from the flue gas. The flue gas may be recycled to the pyrolysis reactor as the fluidizing gas for the pyrolysis reactor. The condensable portion (vapors) of the pyrolysis gases comprising hydrocarbons and any residual oxygenated hydrocarbons is condensed in a condenser into low oxygen biomass-derived pyrolysis oil having substantially improved energy density, lower total acid number (TAN), and higher thermal stability than conventional biomass-derived pyrolysis oil. The low oxygen biomass-derived pyrolysis oil has potential for use as a biofuel substantially eliminating the need for secondary upgrading to remove oxygen therefrom as is needed with conventional biomass-derived pyrolysis oils. Alternatively, the low oxygen biomass-derived pyrolysis oil can be used as to produce aromatic chemicals. In an embodiment, the selectivity to aromatic compounds within the condensable portion of the pyrolysis gases is greater than 33% by weight and possibly greater than 50% by weight. The yield of aromatic compounds is greater than 2% by weight on biomass and preferably greater than 3%.

Pyrolyzing the carbonaceous biomass feedstock in the presence of the UZM-44 catalyst results in spent catalyst. The spent catalyst may be regenerated and recycled when its activity has dropped below a desired level. The time in which the catalyst will maintain its activity varies. Gradually, there may be a loss of catalyst activity due to fouling (e.g., due to carbon deposits formed on the catalyst). The spent UZM-44 zeolite may be heated under such conditions as to remove the carbonaceous materials from a surface thereof. The regenerated catalyst then may be recirculated to the pyrolysis reactor.

The following examples are presented in illustration of this invention and are not intended as undue limitations on the generally broad scope of the invention as set out in the appended claims.

The structure of the UZM-44 zeolite of this invention was determined by x-ray analysis. The x-ray patterns presented in the following examples were obtained using standard x-ray powder diffraction techniques. The radiation source was a high-intensity, x-ray tube operated at 45 kV and 35 ma. The diffraction pattern from the copper K-alpha radiation was obtained by appropriate computer based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, w and vw which represent very strong, strong, medium, weak, and very weak respectively. In terms of $100 \times I/I_o$, the above designations are defined as:

vw=<5; w=6-15; m=16-50; s=51-80; and vs=80-100

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

Example 1

5.28 g of NaOH, (97%) was dissolved in 111.88 g water. 1.16 g Al(OH)$_3$, (29.32 wt.-% Al), was added to the sodium hydroxide solution. Upon the mixture becoming a solution, 33.75 g Ludox AS-40 was added and the solution was stirred vigorously for 1-2 hours and then cooled to 0° C.-4° C. Separately, 8.89 g 1,5-dibromopentane, (97%) was mixed with 9.56 g 1-methylpyrrolidine, (97%) to form a second mixture. The second mixture was added to the cooled mixture to create the final reaction mixture. The final reaction mixture was vigorously stirred and transferred to a 300 cc stirred autoclave. The final reaction mixture was digested at 170° C. for 120 hours with stirring at 100 rpm. The product was isolated by filtration. The product was identified as UZM-44 by XRD. Analytical results showed this material to have the following molar ratios, Si/Al of 11.77, Na/Al of 0.21, N/Al of 1.02, C/N of 7.75. The product generated by this synthesis was calcined under flowing air at 600° for 6 hours. It was then ion exchanged four times with 1 M ammonium nitrate solution at 75° C. followed by a calcination at 500° C. under air for 2 hours to convert NH$_4^+$ into H$^+$. Analysis for the calcined, ion-exchanged sample shows 39.1% Si, 3.26% Al, 90 ppm Na with a BET surface area of 299 m$^2$/g, pore volume of 0.239 cm$^3$/g, and micropore volume of 0.139 cm$^3$/g.

Comparative Example 2

10.8 g of Aerosil 200 was added, while stirring, to a solution of 12.24 g 1,5-bis(N-methylpyrrolidinium)pentane dibromide in 114 g H$_2$O. A very thick gel was formed. Separately, a solution was made from 60 g H$_2$O, 3.69 g NaOH (99%), 0.95 g sodium aluminate (26.1% Al by analysis), and 1.86 g NaBr (99%). This second solution was added to the above mixture. The final mixture was divided equally between 7 45 cc Parr vessels. One vessel, which was digested for 12 days at 170° C. in a rotisserie oven at 15 rpm, yielded a product which was determined by XRD as having the IMF structure. The product was isolated by filtration. Analytical results showed this material to have the following molar ratios, Si/Al of 12.12, Na/Al of 0.08, N/Al of 1.03, C/N of 7.43. The product generated by this synthesis was calcined under flowing air at 600° for 6 hours. It was then ion exchanged four times with 1 M ammonium nitrate solution at 75° C. followed by a calcination at 500° C. under air for 2 hours to convert NH$_4^+$ into H$^+$. Analysis for the calcined, ion-exchanged sample shows 38.8% Si, 2.99% Al, 190 ppm Na with a BET surface area of 340 m$^2$/g, pore volume of 0.260 cm$^3$/g, and micropore volume of 0.160 cm$^3$/g.

Example 3

544 g of NaOH, (97%) was dissolved in 9.53 kg water. 118 g Al(OH)$_3$ was added to the sodium hydroxide solution while stirring. Of Ludox AS-40, 3.83 kg was added and the solution was stirred vigorously for 2 hours and then cooled to 0° C.-5° C. A solution containing 941 g H$_2$O, 453 g 1,5-dibromopentane and 325 g N-methylpyrrolidine was added to the cooled mixture to create the final reaction mixture. The final reaction mixture was vigorously stirred and transferred to a 5 gallon stirred autoclave before digestion at 160° C. for 11 days. The product was isolated by filtration. The product was identified as UZM-44 by XRD. Analytical results showed this material to have the following molar ratios, Si/Al of 11.77, Na/Al of 0.21, N/Al of 1.02, C/N of 7.75. The product generated by this synthesis was calcined under flowing air at 600° for 6 hours. Analysis for the calcined sample shows a BET surface area of 301 m$^2$/g, pore volume of 0.238 cm$^3$/g, and micropore volume of 0.142 cm$^3$/g.

Example 4

A UZM-44 in the H+ form was loaded into a vertical steamer. The UZM-44 was exposed to 100% steam at 725° C. for 12 hours or 24 hours. The starting UZM-44 had a BET surface area of 340 m$^2$/g, pore volume of 0.301 cm$^3$/g, and micropore volume of 0.154 cm$^3$/g. After 12 hours of steaming, the UZM-44 was still identified as UZM-44 by XRD though the intensity of the first 3 peaks had increased to very strong, very strong-strong, and very strong-strong respectively. All other peaks were at positions and intensities described in Table B. The material had a BET surface area of 274 m$^2$/g, pore volume of 0.257 cm$^3$/g, and micropore volume of 0.127 cm$^3$/g. After 24 hours of steaming, the UZM-44 was still identified as UZM-44 by XRD though the intensity of the first 3 peaks had increased to very strong, very strong-strong, and very strong-strong respectively. All other peaks were at positions and intensities described in Table B. The material had a BET surface area of 276 m$^2$/g, pore volume of 0.262 cm$^3$/g, and micropore volume of 0.128 cm$^3$/g.

Example 5

UZM-44 was synthesized from a gel of composition 1 Al$_2$O$_3$: 43.6 SiO$_2$: 11.6 Na$_2$O: 6.52 1,5-dibromopentane: 18.95 N-methylpyrrolidine: 1321 H$_2$O by dissolving NaOH in water and then adding liquid sodium aluminate to the sodium hydroxide solution. Ultrasil VN3 was then added as the silica source followed by 1,5-dibromopentane and N-methylpyrrolidine to form the final reaction mixture. The final reaction mixture was vigorously stirred and transferred to a 2 L stirred autoclave. The final reaction mixture was digested at 50° C. for 24 h then at 160° C. for 12 days while stirring. The product was isolated by filtration. The product was identified as UZM-44 by XRD. The product generated by this synthesis was calcined under flowing air at 600° for 6 hours. It was then ion-exchanged with 1 M ammonium nitrate solution.

Example 6

The UZM-44 of Example 5 was extruded as 1/16" cylinders in a 75/25 zeolite/Al$_2$O$_3$ formulation and the extrudates dried and calcined at 550° C. for 3 hours. The extrudates were crushed and meshed to 60-180 mesh before testing. These catalyst particles were then loaded in a FCC type riser reactor and fluidized in a flow of $H_2$. After 0.5 hrs at 400° C. the temperature was raised to the reaction temperature of 550° C. Dried biomass of ground oak chips was then introduced in the reactor by switching the lift gas to the feed sampling manifold. Experiments were conducted at a catalyst:biomass volume ratio of 8. During the duration of the experiment, the biomass and catalyst were intimately mixed during fluidization and the condensable portion of the vapor phase products were collected in traps with toluene and isopropanol solvent held in an ice bath. Vapor from the reactor outlet flowed through the two traps in an ice bath. Products collected in the two traps consisted mainly of water and organic components. Both liquids were submitted for water and organic components analysis. These trap solutions were analyzed by GC for organic components, as was a rinse liquid from the reactor which recovered condensed products from the reactor walls. Depending on the catalyst properties and reaction conversion, hundreds of species may be observed. However, only 32 major species have been identified. These 32 species were grouped into several groups: aromatics, non-aromatic hydrocarbons, alcohols, ketones, aldehydes, acids, phenols, esters, nitriles, and furans. Unidentified species from the GC result are grouped as "unknowns/other oxygenates". The amounts of liquid organic products were estimated based versus a known amount of dodecane pre-mixed into solvent. The spent catalyst was analyzed for percent carbon and the gaseous products were analyzed for CO, $CO_2$ and light hydrocarbons with an on-line gas analyzer. All analytical results (coke, water, $CO/CO_2$ and light hydrocarbons in gas phase, and components in liquid phase) are normalized by the biomass feed in order to calculate product yields (wt %). Typically, a total product yield (mass balance) of less than 100% was observed since some heavy components were not measured. For example, the heavy deposits on the reactor wall, if any, during the test were not included. The combination of these analyses provided two levels of detail regarding product information. One was the major products distribution categorized as coke, water, CO, $CO_2$, $CH_4$, $C_2H_4$, and total organics. Another was the yields of major liquid organic component produced (aromatics, non-aromatic hydrocarbons, alcohols, ketones, aldehydes, acids, phenols, esters, nitriles, and furans).

The resulting data in Table 1 shows that UZM-44 gave a good yield of low oxygen bio-mass derived pyrolysis oil with a very high yield to aromatics and other hydrocarbons. By comparison, thermal pyrolysis using only sand gave a good yield of low oxygen bio-mass derived pyrolysis oil, but little of that product was an aromatic or other hydrocarbon. Large pore zeolites, including a FAU type (US-Y), MOR and MTW, were tested as comparative catalysts, and showed small yields of pyrolysis oil with small yields of aromatics and other hydrocarbons.

TABLE 1

|  | sand | 30% US-Y/ SiO2 | 75% MOR/ Al2O3 | 75% MTW/ Al2O3 | 75% UZM-44/ Al2O3 |
|---|---|---|---|---|---|
| Yield of low oxygen biomass-derived pyrolysis oil (wt %) | 17 | 8 | 5 | 3 | 14 |
| Yield (wt %) of: | | | | | |
| Ketones | 0.90 | 1.20 |  | 0.14 |  |
| Aldehydes | 1.03 | 0.93 |  |  | 0.25 |
| Acids | 3.48 | 0.93 |  |  | 0.50 |
| Esters | 0.13 |  |  |  |  |
| Nitriles | 0.13 |  |  |  |  |
| Aromatics | 0.39 | 1.07 | 2.00 | 1.43 | 5.05 |
| Phenols | 0.26 | 0.27 |  | 0.14 | 0.25 |
| Hydrocarbons |  | 0.13 | 0.50 | 0.57 | 0.88 |
| Other Oxygenates | 10.69 | 3.47 | 2.50 | 0.71 | 7.06 |

The invention claimed is:

1. A process for producing low oxygen biomass-derived pyrolysis oil comprising contacting a carbonaceous biomass feedstock with a microporous crystalline zeolitic catalyst at pyrolysis conditions to produce pyrolysis gases comprising hydrocarbons, the catalyst catalyzing a deoxygenation reaction converting at least a portion of the oxygenated hydrocarbons into hydrocarbons and removing the oxygen as carbon oxides and water; and condensing a condensable portion of the pyrolysis gases to produce low oxygen biomass-derived pyrolysis oil; wherein the catalyst comprises:

a. a microporous crystalline zeolite, UZM-44, having a three-dimensional framework of at least $AlO_2$ and $SiO_2$ tetrahedral units and an empirical composition in the as synthesized and anhydrous basis expressed by an empirical formula of:

$$Na_nM_m^{k+}T_rAl_{1-x}E_xSi_yO_z$$

where "n" is the mole ratio of Na to (Al+E) and has a value from approximately 0.05 to 0.5, M represents a metal or metals selected from the group consisting of zinc, Group 1 (IUPAC 1), Group 2 (IUPAC 2), Group 3 (IUPAC 3), the lanthanide series of the periodic table, and any combination thereof, "m" is the mole ratio of M to (Al+E) and has a value from 0 to 0.5, "k" is the average charge of the metal or metals M, T is the organic structure directing agent or agents derived from reactants R and Q where R is an A,Ω-dihalogen substituted alkane having 5 carbon atoms and Q is at least one neutral monoamine having 6 or fewer carbon atoms, "t" is the mole ratio of N from the organic structure directing agent or agents to (Al+E) and has a value of from 0.5 to 1.5, E is an element selected from the group consisting of gallium, iron, boron and combinations thereof, "x" is the mole fraction of E and has a value from 0 to about 1.0, "y" is the mole ratio of Si to (Al+E) and varies from greater than 9 to about 25 and "z" is the mole ratio of O to (Al+E) and has a value determined by the equation:

$$z=(n+k \cdot m+3+4 \cdot y)/2$$

b.
and
wherein the microporous crystalline zeolite, UZM-44, is further characterized in that it has the x-ray diffraction pattern having at least the d-spacings and intensities set forth in Table A:

TABLE A

| 2-Theta | d(Å) | I/Io % |
|---|---|---|
| 7.72 | 11.45 | m |
| 8.88 | 9.95 | m |

TABLE A-continued

| 2-Theta | d(Å) | I/Io % |
|---|---|---|
| 9.33 | 9.47 | m |
| 12.47 | 7.09 | w-m |
| 12.85 | 6.88 | vw |
| 14.62 | 6.05 | vw-w |
| 15.27 | 5.80 | w |
| 15.57 | 5.68 | w |
| 16.60 | 5.34 | w |
| 17.70 | 5.01 | vw-w |
| 18.71 | 4.74 | w-m |
| 19.30 | 4.59 | w |
| 22.55 | 3.94 | m |
| 23.03 | 3.86 | vs |
| 23.39 | 3.80 | s |
| 24.17 | 3.68 | m |
| 25.01 | 3.56 | m |
| 26.19 | 3.40 | vw-w |
| 26.68 | 3.34 | w-m |
| 28.76 | 3.10 | w-m |
| 30.07 | 2.97 | w |
| 35.72 | 2.51 | vw-w |
| 45.08 | 2.01 | w |
| 45.83 | 1.98 | vw-w |
| 46.77 | 1.94 | vw-w. |

2. The process of claim 1 wherein the microporous crystalline zeolitic catalyst is thermally stable up to a temperature of greater than 600° C.

3. The process of claim 1 wherein the microporous crystalline zeolitic catalyst has a micropore volume as a percentage of total pore volume of less than 60%.

4. The process of claim 1 wherein the microporous crystalline zeolitic catalyst has a micropore volume of less than 0.155 mL/g.

5. The process of claim 1 wherein the microporous crystalline zeolitic catalyst has micropore volume of less than 0.150 mL/g.

6. The process of claim 1 wherein the microporous crystalline zeolitic catalyst exhibits no feature at 200-300 Å on a dV/dlog D versus pore diameter plot of differential volume of nitrogen adsorbed as a function of pore diameter.

7. The process of claim 1 wherein the microporous crystalline zeolitic catalyst exhibits an adsorption feature occurring at greater than 450 Å on a dV/dlog D versus pore diameter plot of differential volume of nitrogen adsorbed as a function of pore diameter.

8. The process of claim 1 wherein the differential volume of nitrogen adsorbed by the microporous crystalline zeolitic catalyst at a pore diameter of 475 Å is greater than 00.1 mL $N_2$/gÅ on a dV/dlog D versus pore diameter plot of differential volume of nitrogen adsorbed as a function of pore diameter.

9. The process of claim 1 wherein the differential volume of nitrogen adsorbed by the microporous crystalline zeolitic catalyst at pore diameters greater than 475 Å is greater than 0.1 mL $N_2$/gÅ on a dV/dlog D versus pore diameter plot of differential volume of nitrogen adsorbed as a function of pore diameter.

10. The process of claim 1 wherein the hydrocarbons produced include aromatic compounds and the selectivity to aromatic compounds within the condensable portion of the pyrolysis gases is greater than 33% by weight.

11. The process of claim 1 wherein the hydrocarbons produced include aromatic compounds and the selectivity to aromatic compounds within the condensable portion of the pyrolysis gases is greater than 50% by weight.

12. The process of claim 1 wherein the hydrocarbons produced include aromatic compounds and the yield of aromatic compounds is greater than 2% by weight based upon the biomass.

13. The process of claim 1 wherein the hydrocarbons produced include aromatic compounds and the yield of aromatic compounds is greater than 3% by weight based upon biomass.

14. The process of claim 1 wherein the pyrolysis conditions include a temperature from about 300° C. to about 800° C.

15. The process of claim 1 wherein the catalyst is in a fluidized state.

16. The process of claim 1 wherein the step of contacting the carbonaceous biomass feedstock with a microporous crystalline zeolitic catalyst at pyrolysis conditions is carried out at a catalyst-to-carbonaceous biomass feedstock ratio of about 0.1 to about 200.

17. The process of claim 1 wherein the microporous crystalline zeolitic catalyst comprises the heat transfer medium for a fast pyrolysis process.

18. A process for producing low oxygen biomass-derived pyrolysis oil comprising pyrolyzing a carbonaceous biomass feedstock by contacting the carbonaceous biomass feedstock with a microporous crystalline zeolitic catalyst at pyrolysis conditions to produce pyrolysis gases comprising hydrocarbons, the catalyst catalyzing a deoxygenation reaction converting at least a portion of the oxygenated hydrocarbons into hydrocarbons and removing the oxygen as carbon oxides and water; and condensing a condensable portion of the pyrolysis gases to produce low oxygen biomass-derived pyrolysis oil; wherein the catalyst comprises
a. a microporous crystalline zeolite, UZM-44, having a three-dimensional framework of at least $AlO_2$ and $SiO_2$ tetrahedral units and an empirical composition in the as synthesized and anhydrous basis expressed by an empirical formula of:

$$Na_n M_m^{k+} T_t Al_{1-x} E_x Si_y O_z$$

where "n" is the mole ratio of Na to (Al+E) and has a value from approximately 0.05 to 0.5, M represents a metal or metals selected from the group consisting of zinc, Group 1 (IUPAC 1), Group 2 (IUPAC 2), Group 3 (IUPAC 3), the lanthanide series of the periodic table, and any combination thereof, "m" is the mole ratio of M to (Al+E) and has a value from 0 to 0.5, "k" is the average charge of the metal or metals M, T is the organic structure directing agent or agents derived from reactants R and Q where R is an A,Ω-dihalogen substituted alkane having 5 carbon atoms and Q is at least one neutral monoamine having 6 or fewer carbon atoms, "t" is the mole ratio of N from the organic structure directing agent or agents to (Al+E) and has a value of from 0.5 to 1.5, E is an element selected from the group consisting of gallium, iron, boron and combinations thereof, "x" is the mole fraction of E and has a value from 0 to about 1.0, "y" is the mole ratio of Si to (Al+E) and varies from greater than 9 to about 25 and "z" is the mole ratio of O to (Al+E) and has a value determined by the equation:

$$z=(n+k\cdot m+3+4\cdot y)/2$$

and
wherein the macroporous crystalline zeolite, UZM-44, is further characterized in that it has the x-ray diffraction pattern having at least the d-spacings and intensities set forth in Table A:

TABLE A

| 2-Theta | d(Å) | I/Io % |
|---|---|---|
| 7.72 | 11.45 | m |
| 8.88 | 9.95 | m |
| 9.33 | 9.47 | m |

TABLE A-continued

| 2-Theta | d(†) | I/Io % |
|---------|------|--------|
| 12.47 | 7.09 | w-m |
| 12.85 | 6.88 | vw |
| 14.62 | 6.05 | vw-w |
| 15.27 | 5.80 | w |
| 15.57 | 5.68 | w |
| 16.60 | 5.34 | w |
| 17.70 | 5.01 | vw-w |
| 18.71 | 4.74 | w-m |
| 19.30 | 4.59 | w |
| 22.55 | 3.94 | m |
| 23.03 | 3.86 | vs |
| 23.39 | 3.80 | s |
| 24.17 | 3.68 | m |
| 25.01 | 3.56 | m |
| 26.19 | 3.40 | vw-w |
| 26.68 | 3.34 | w-m |
| 28.76 | 3.10 | w-m |
| 30.07 | 2.97 | w |
| 35.72 | 2.51 | vw-w |
| 45.08 | 2.01 | w |
| 45.83 | 1.98 | vw-w |
| 46.77 | 1.94 | vw-w. |

\* \* \* \* \*